(12) United States Patent
Wong et al.

(10) Patent No.: US 11,646,840 B2
(45) Date of Patent: May 9, 2023

(54) COMMUNICATIONS DEVICE, INFRASTRUCTURE EQUIPMENT, WIRELESS COMMUNICATIONS NETWORK AND METHODS

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/098,134

(22) PCT Filed: Apr. 27, 2017

(86) PCT No.: PCT/EP2017/060113
§ 371 (c)(1),
(2) Date: Nov. 1, 2018

(87) PCT Pub. No.: WO2017/194324
PCT Pub. Date: Nov. 16, 2017

(65) Prior Publication Data
US 2019/0158242 A1 May 23, 2019

(30) Foreign Application Priority Data

May 13, 2016 (EP) .................................. 16169734

(51) Int. Cl.
*H04L 5/00* (2006.01)
*H04L 1/1607* (2023.01)
(Continued)

(52) U.S. Cl.
CPC .............. *H04L 5/0048* (2013.01); *H04L 1/16* (2013.01); *H04L 1/1671* (2013.01);
(Continued)

(58) Field of Classification Search
CPC ....... H04L 5/0048; H04L 1/16; H04L 1/1671; H04L 5/0082; H04L 5/0091; H04L 5/0023; H04L 5/0044; H04L 5/14
See application file for complete search history.

(56) References Cited

U.S. PATENT DOCUMENTS 8,520,572 B2 * 8/2013 Brown .................. H04L 1/0025
370/310
8,699,436 B2 * 4/2014 Noh ...................... H04L 1/1893
370/437

(Continued)

FOREIGN PATENT DOCUMENTS

EP 3435701 1/2019

OTHER PUBLICATIONS

Holma, H. and Toskala, A., "LTE for UMTS: OFDMA and SC-FDMA Based Radio Access," First published: Mar. 31, 2009, Copyright © 2009 John Wiley & Sons, Ltd, Print ISBN: 9780470994016, pp. 25-27.

(Continued)

Primary Examiner — Kibrom T Hailu
Assistant Examiner — Bailor C Hsu
(74) Attorney, Agent, or Firm — Xsensus LLP (57) ABSTRACT

A communications device is configured to transmit and/or receive signals via a wireless access interface provided by a mobile communications network. The wireless access interface comprising a plurality of transmission units each comprising one or more communications resource elements formed by dividing a system bandwidth in time and frequency. One or more transmission units are configured to form combined transmission units, which can be allocated to communications devices for receiving or transmitting signals. The communications device is configured to receive an indication of a combined transmission unit providing one or more of the transmission units for the communications (Continued)

device, and receive an indication for each of the one or more transmission units of the combined transmission unit of whether the transmission unit is for transmitting signals, whether the transmission unit is for receiving signals or whether the transmission unit is not to be used for transmitting or receiving signals.

17 Claims, 7 Drawing Sheets

(51) Int. Cl.
  *H04L 1/16* (2023.01)
  *H04L 5/14* (2006.01)
(52) U.S. Cl.
  CPC .......... *H04L 5/0082* (2013.01); *H04L 5/0091* (2013.01); *H04L 5/0023* (2013.01); *H04L 5/0044* (2013.01); *H04L 5/14* (2013.01)

(56) References Cited

U.S. PATENT DOCUMENTS

| | | | | |
|---|---|---|---|---|
| 8,934,424 | B2* | 1/2015 | Yin | H04W 72/0446 370/329 |
| 9,113,463 | B2* | 8/2015 | Chen | H04L 5/0053 |
| 9,131,491 | B2* | 9/2015 | Lee | H04L 5/0016 |
| 9,497,738 | B2* | 11/2016 | Choi | H04W 76/14 |
| 9,516,638 | B2* | 12/2016 | Seo | H04W 72/1247 |
| 9,813,212 | B2* | 11/2017 | Guan | H04L 5/0053 |
| 10,044,480 | B2* | 8/2018 | Froberg | H04L 5/0023 |
| 10,727,999 | B2* | 7/2020 | Byun | H04B 7/024 |
| 11,129,152 | B2* | 9/2021 | You | H04W 72/042 |
| 2008/0080465 | A1* | 4/2008 | Pajukoski | H04L 1/003 370/342 |
| 2008/0225788 | A1* | 9/2008 | Inoue | H04L 1/1867 370/329 |
| 2009/0073915 | A1* | 3/2009 | Zhang | H04B 7/2606 370/315 |
| 2010/0067465 | A1* | 3/2010 | Miki | H04L 5/0037 370/329 |
| 2010/0279628 | A1* | 11/2010 | Love | H04L 5/0091 455/70 |
| 2011/0038321 | A1* | 2/2011 | Kim | H04L 5/0007 370/328 |
| 2013/0100938 | A1* | 4/2013 | Kwon | H04L 27/2655 370/336 |
| 2014/0064206 | A1* | 3/2014 | Bao | H04W 72/1278 370/329 |
| 2014/0161085 | A1* | 6/2014 | Kim | H04W 72/042 370/329 |
| 2014/0219199 | A1* | 8/2014 | Ji | H04W 88/08 370/329 |
| 2015/0043392 | A1* | 2/2015 | Susitaival | H04W 72/0446 370/280 |
| 2016/0080133 | A1 | 3/2016 | Von Elbwar | |
| 2016/0234817 | A1* | 8/2016 | Koyanagi | H04L 5/0064 |
| 2017/0171880 | A1* | 6/2017 | Chae | H04W 72/0413 |
| 2017/0222768 | A1* | 8/2017 | Lee | H04L 25/0204 |
| 2017/0294978 | A1* | 10/2017 | Byun | H04B 7/0413 |
| 2018/0198666 | A1* | 7/2018 | Wang | H04L 27/2662 |

OTHER PUBLICATIONS

NTT Docomo, "New SID Proposal: Study on New Radio Access Technology," RP-160671, 3GPP TSG RAN Meeting #71, Göteborg, Sweden, Mar. 7-10, 2016, pp. 1-8.

NTT Docomo, Inc., "Initial views on frame structure for NR access technology," R1-163112, 3GPP TSG RAN WG1 Meeting #84bis, Busan, Korea Apr. 11-15, 2016, pp. 1-7.

Sesia. S. et al., "LTE—The UMTS Long Term Evolution: From Theory to Practice," Second Edition, Including Release 10 for LTE-Advanced, © 2011 John Wiley & Sons Ltd., Jan. 1, 2011, pp. 68.

International Search Report and Written Opinion for International Application No. PCT/EP2017/060113, dated Jul. 28, 2017.

NTT Docomo et al: "5G Vision for 2020 and Beyond", 3GPP Draft; RWS-150051 5G Vision Docomo, 3rd Generation Partnership Project (3GPP), Mobile Competence Centre ; 650, Route Des Lucioles ; F-06921 Sophia-Antipolis Cedex ; France, No. Phoenix, AZ, USA; Sep. 17, 2015-Sep. 18, 2015 Sep. 3, 2015 (Sep. 3, 2015), XP051043631, Retrieved from the Internet: URL:http://www.3gpp.org/ftp/Meetings_3GPP_SYNC/WORKSHOP/Docs/ [retrieved on Sep. 3, 2015].

* cited by examiner

Examples of Transmission Unit

FIG. 4

Example of using different CTU for UE in different speed

FIG. 5 fast ACK / NACK

CTU enabling fast acknowledgment

FIG. 6

DL-centric TDD super-structure

CTU with extended DL transmission

FIG. 7

CTU for massive MIMO in TDD

COMMUNICATIONS DEVICE, INFRASTRUCTURE EQUIPMENT, WIRELESS COMMUNICATIONS NETWORK AND METHODS

CROSS-REFERENCE TO RELATED APPLICATIONS

This application is a National Stage Application based on PCT/EP2017/060113, filed 27 Apr. 2017, and claims priority to European Patent Application No. 16169734.7 on 13 May 2016, the entire contents of which being incorporated herein by reference.

BACKGROUND

Field of Disclosure

The present disclosure relates to communications devices, which are configured to transmit uplink signals to and/or receive downlink signals from an infrastructure equipment of a mobile communications network via a wireless access interface. The present technique also relates to infrastructure equipment and methods of communicating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

The wireless access interface of an LTE-type mobile communications network is configured to have a time divided frame structure comprising a frame length of 10 ms, which is comprised of ten subframes having a 1 ms duration, with each subframe being comprised of fourteen communications resource elements of Orthogonal Frequency Division Multiplexed (OFDM) symbols. However whilst the frame structure for LTE has been in general designed to provide high data rates, future radio access technologies may be required to support a much greater variety of applications and use cases.

SUMMARY OF THE DISCLOSURE

According to an example embodiment of the present technique there is provided a communications device configured to transmit signals to and/or receive signals from an infrastructure equipment of a mobile communications network. The communications device comprises a receiver, a transmitter and a controller. The controller controls the transmitter and the receiver to transmit and/or receiver signals via a wireless access interface provided by the mobile communications network. The wireless access interface is configured to comprise a plurality of transmission units, each of the transmission units comprising one or more communications resource elements. The communications resource elements are formed by dividing a system bandwidth in time and frequency. One or more transmission units are configured to form combined transmission units, which can be allocated by the wireless communications network to communications devices for receiving signals from the infrastructure equipment or transmitting signals to the infrastructure equipment. The controller is configured with the receiver to receive an indication from the infrastructure equipment of a combined transmission unit providing one or more of the transmission units for the communications device, and to receive an indication for each of the one or more transmission units of the combined transmission unit of whether the transmission unit is for transmitting signals to the infrastructure equipment on the uplink, whether the transmission unit is for receiving signals from the infrastructure equipment on the downlink or whether the transmission unit is not to be used for transmitting or receiving signals Example embodiments of the present technique can provide an arrangement in which a wireless access interface comprises a plurality of communications resource elements arranged in time and frequency, the wireless access interface being configured and arranged to comprise a plurality of transmission units, each of the transmission units comprising a predetermined number of the communications resource elements. Furthermore, the wireless communications network is configured to form combined transmission units from one or more of the transmission units, which can be allocated by the wireless communications network to one or more communications devices for receiving signals from the infrastructure equipment or transmitting signals to the infrastructure equipment.

Embodiments of the present technique can be arranged to allocate communications resources of a wireless access interface based on combined transmission units, which can be adapted and configured to support a greater variety of applications and use cases.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
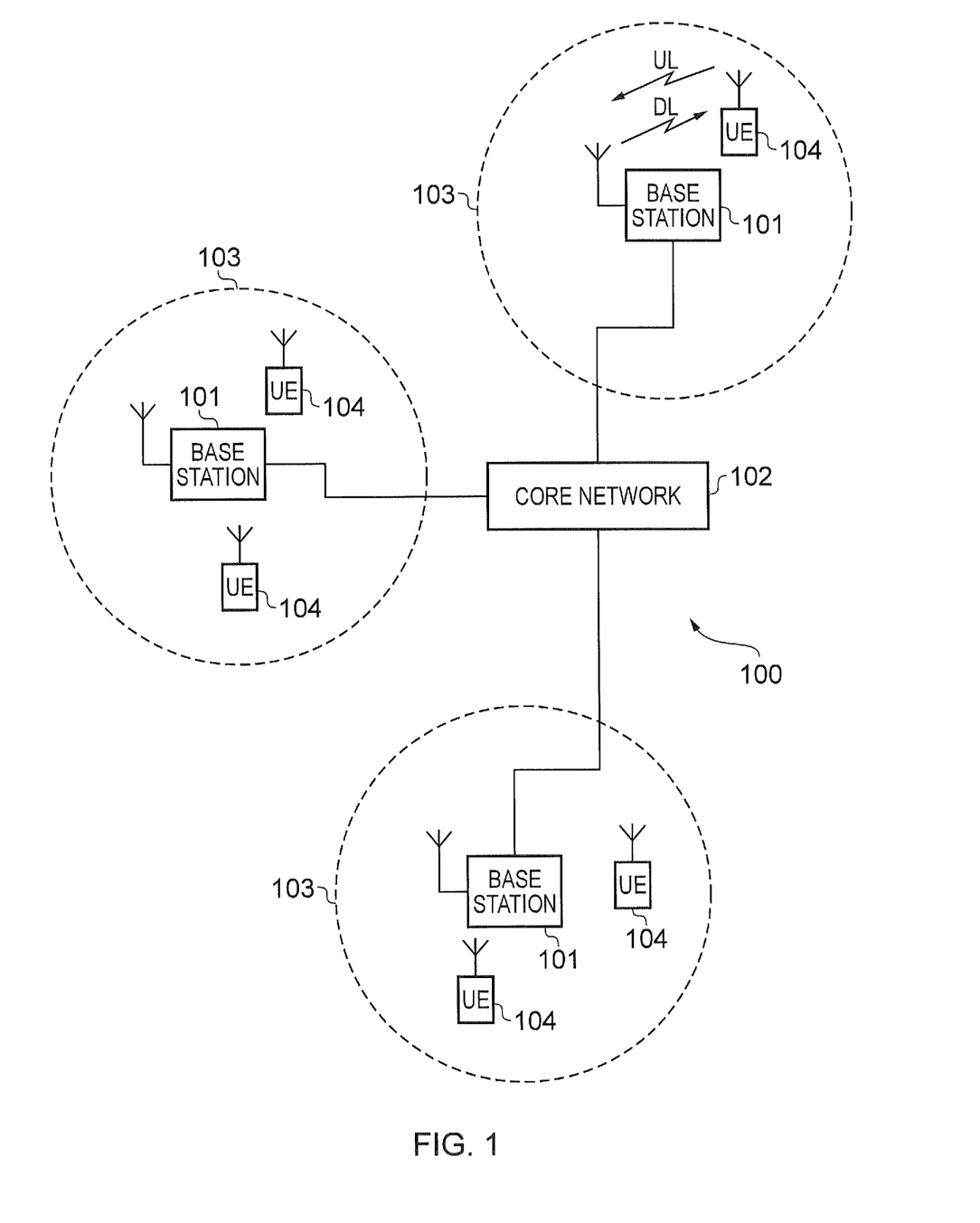
FIG. 1 is a schematic block diagram illustrating an example of a mobile telecommunication system.

Conventional Communications System FIG. 1 provides a schematic diagram illustrating some basic functionality of a mobile telecommunications network/system 100 operating in accordance with LTE principles and which may be helpful in appreciating the embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
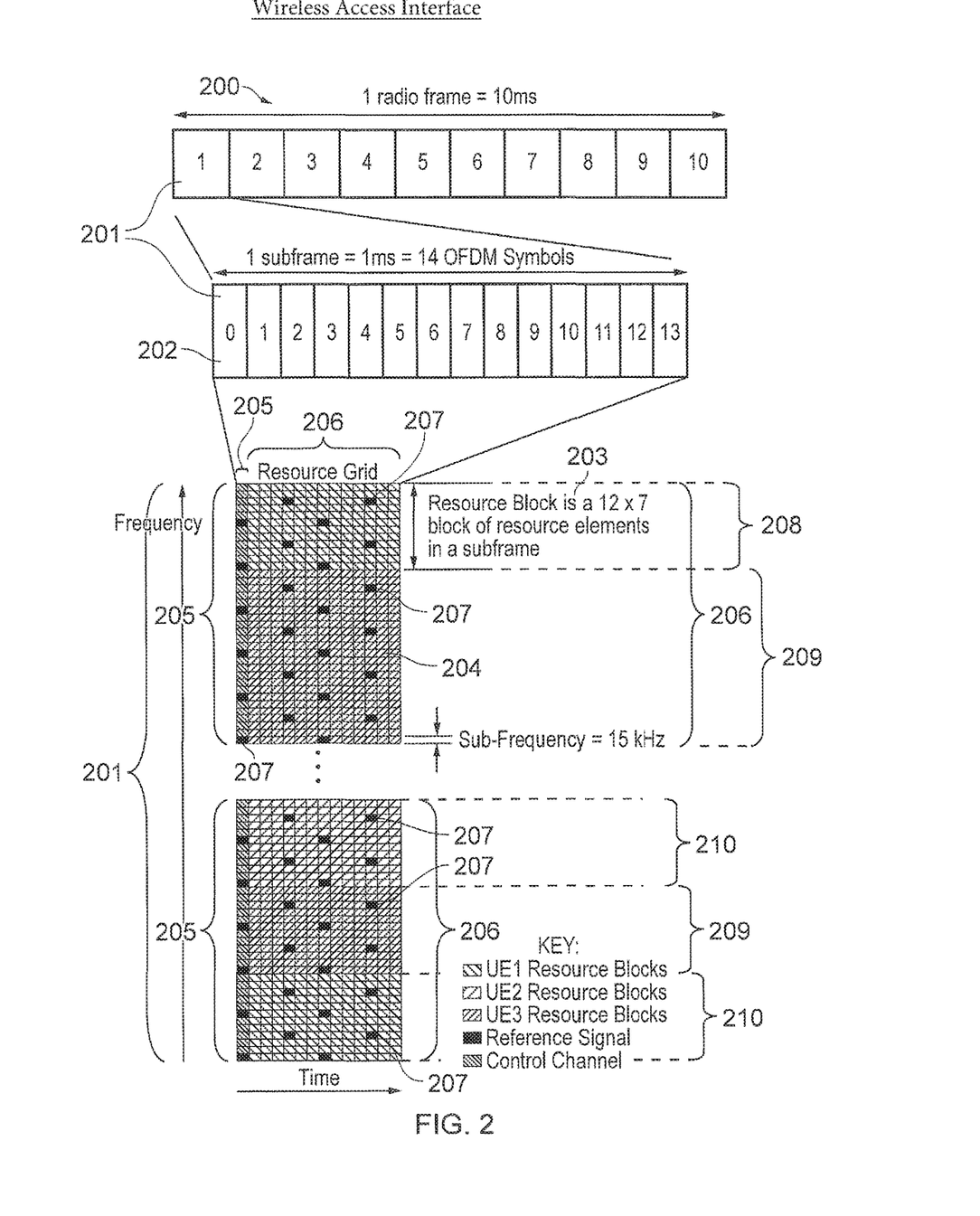
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is conventionally fixed at 15 KHz. However it has been proposed in the future [2][3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
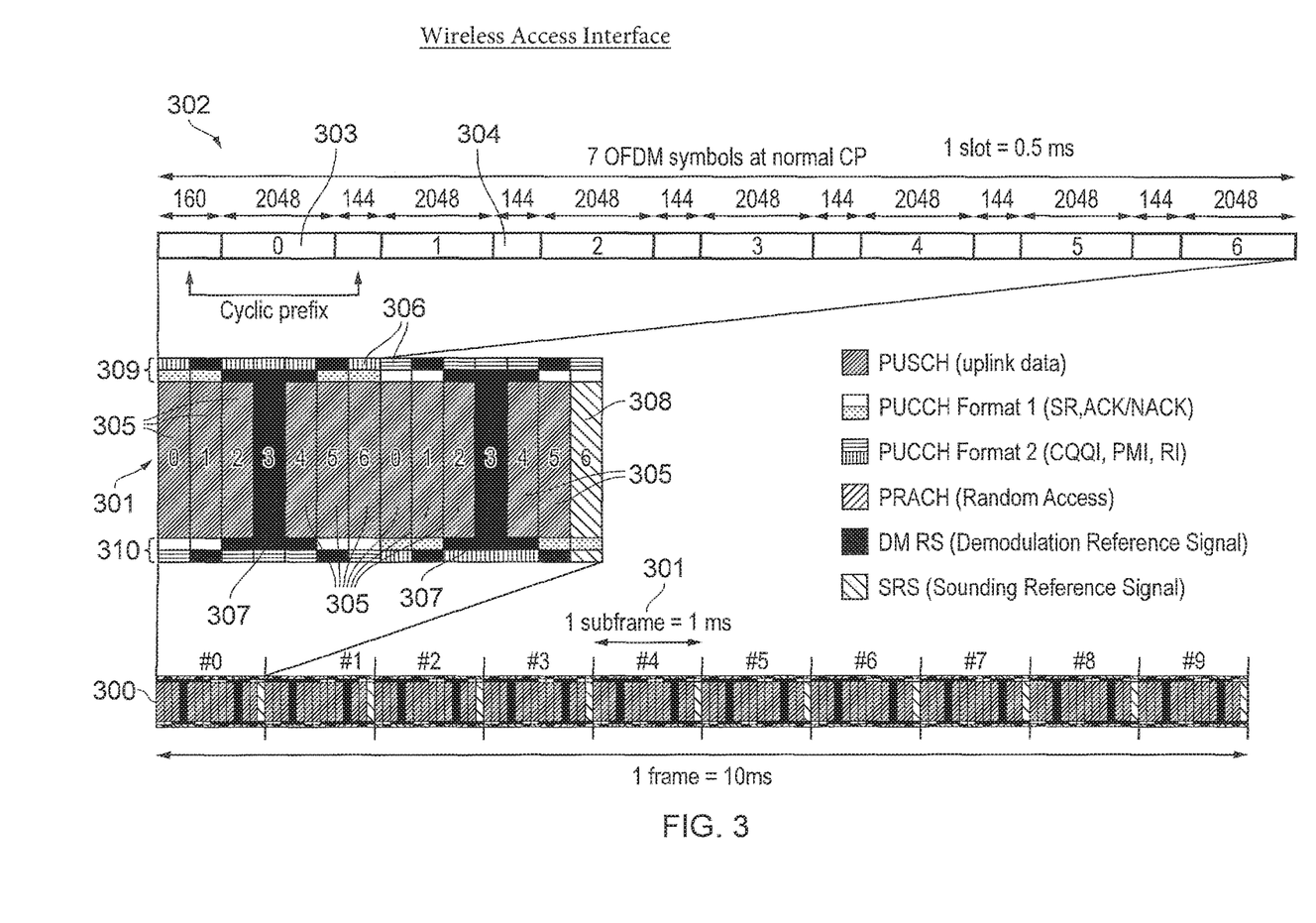
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Flexible Frame Structure

It has been proposed for future wireless access interfaces to develop a New Radio Access Technology (NR) [1]. This new Radio Access Technology (RAT) is proposed for a next generation wireless communication system, i.e. 5G. The new RAT is proposed to operate in a large range of frequencies, from hundreds of MHz to 100 GHz and it is expected to cover a broad range of use cases. The use cases that are considered for this new RAT are:

Enhanced Mobile Broadband (eMBB)
Massive Machine Type Communications (mMTC)
Ultra Reliable & Low Latency Communications (URLLC)

This new RAT is also expected to be forward compatible, i.e., the legacy design should allow future system (e.g. RAT or feature) to easily share resources with this NR.

One of the aspects for NR is the frame structure to be used for transmissions. As explained above with reference to FIGS. 1, 2 and 3, in LTE, the frame structure consists of a downlink subframe 201 and uplink subframe 300 which are fixed to 1 ms duration. LTE was designed with broadband use cases in mind and hence a fixed 1 ms subframe was used. However, in NR, the use cases have different (opposing) requirements. For example in URLLC, the transmission needs to be sent quickly with high reliability whereas for mMTC, the transmission is often tolerant to high latency. In eMBB, the large packet size is expected to be transmitted frequently whereas in mMTC, small packet size is expected infrequently. Hence, a single frame structure such as a fixed 1 ms subframe defined in LTE is not suitable to cover such broad use cases.

Embodiments of the present technique can provide an arrangement in which a wireless access interface comprises a plurality of communications resource elements arranged in time and frequency, the wireless access interface being configured and arranged to comprise a plurality of transmission units, each of the transmission units comprising a predetermined number of the communications resource elements. Furthermore, the wireless communications network is configured to form combined transmission units from one or more of the transmission units, which can be allocated by the wireless communications network to one or more communications devices for receiving signals from the infrastructure equipment or transmitting signals to the infrastructure equipment.

Figure 4:
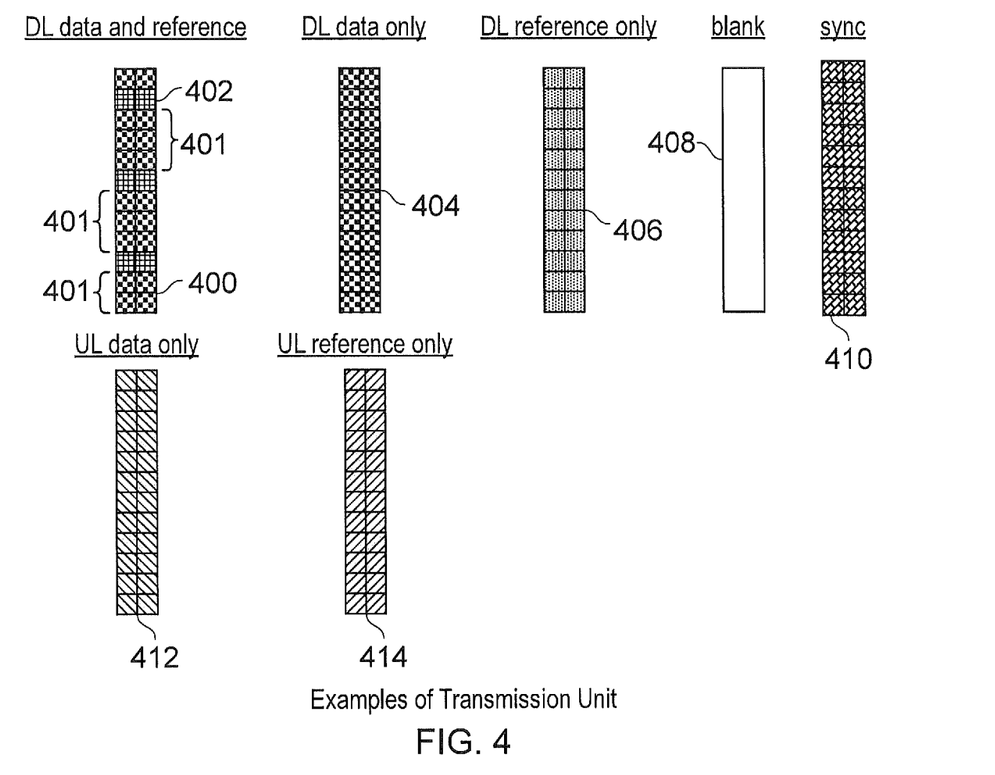
FIG. 4 is a schematic illustration of different types of transmission units according to the present technique.

For example the communications resources may be formed into a grid of time and frequency elements, which may be for example units of OFDM symbols. One or more of the time and frequency resources define basic building blocks, which can be combined to form a frame structure dedicated to a communications device or group of communications devices. In the following paragraphs this building block is referred to as Transmission Unit (TU). A TU consists of a set of resources (e.g. frequency, time, code) that perform one or more functions. Some examples of TU are:

Data resources & reference resources
Reference resource only
Data resource only
Blank
Synchronisation resources These examples are shown in FIG. 4 where for illustration purpose we use the LTE resource element as making-up the communications resources. Here the TU is two symbols long. It should be appreciated that other TU lengths are possible and they need not be a fixed size and different TUs can have different lengths.

In some examples one or more TUs may be grouped to define a Combined TU (CTU), where the CTU consists of one or more TUs concatenated in time or frequency. The CTU thus forms a frame structure, similar to a subframe in LTE. The network would then signal to the UEs various TUs that forms a CTU where each CTU can then be tailored to a specific use case or application. In this way the network has flexibility to transmit a frame structure that is suitable and/or adapted for a particular UE under a particular use case or application.

In FIG. 4 a first example 400 shows a combination of TU's to form a CTU which includes TU's for transmitting data 401 and TU's for transmitting reference symbols 402. As shown for the examples in FIG. 4 each of the example CTU's comprise TU's of two OFDM symbols and therefore each CTU has a column width of 2 but a number of rows representing 12 CTU's in frequency. A second example 404 provides a CTU with TU's for transmission of downlink data only whereas a third TU 406 provides an example of a CTU with TU's for transmission of reference signals only. A fourth example 408 illustrates a CTU in which nothing is transmitted and is therefore blank whereas a fifth example represents a CTU for transmission of synchronisation signals 410. As will be appreciates some TU's may be allocated for the downlink and some for the uplink. Two further examples 412, 414 provide examples of CTU's for transmission of uplink data only 412 and uplink reference symbols only 414.

Figure 5:
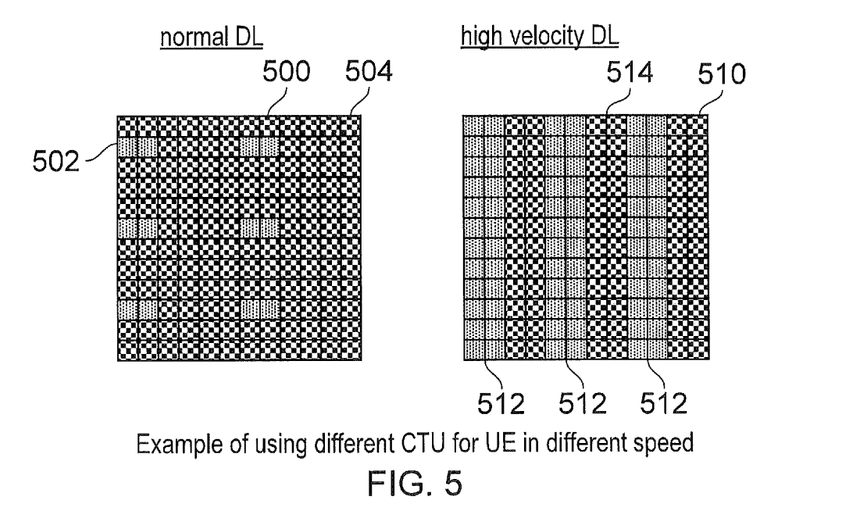
FIG. 5 is a schematic illustration of different examples of combined transmission units according to the present technique.

An example illustrating different use cases is shown in FIG. 5. In FIG. 5 a first example CTU 500 provides a CTU for normal downlink data transmission and therefore includes reference symbols reference TU's 502 and TU's for transmitting data 504 but the reference TU's are relatively sparsely arranged for sampling a slow moving or not rapidly changing channel. In contrast the second example 510 provides a corresponding illustration with each of 3 columns of reference symbols separated by columns of data TU's 514. For a second example 510 the CTU is designed for transmitting data on the downlink to a fast moving UE and therefore the channel is rapidly changing and therefore requires and increased density of reference signal elements or symbols. A UE may be under high speed conditions benefit from having more Reference Signals in time (right hand side 510 of FIG. 5) compared to another UE that is in normal speed (left hand side 500 of FIG. 5). The network can then indicate one set of TUs for the high speed UE with denser Reference Signal and another set of TUs for a normal speed UE that has less dense Reference Signal.

Figure 6:
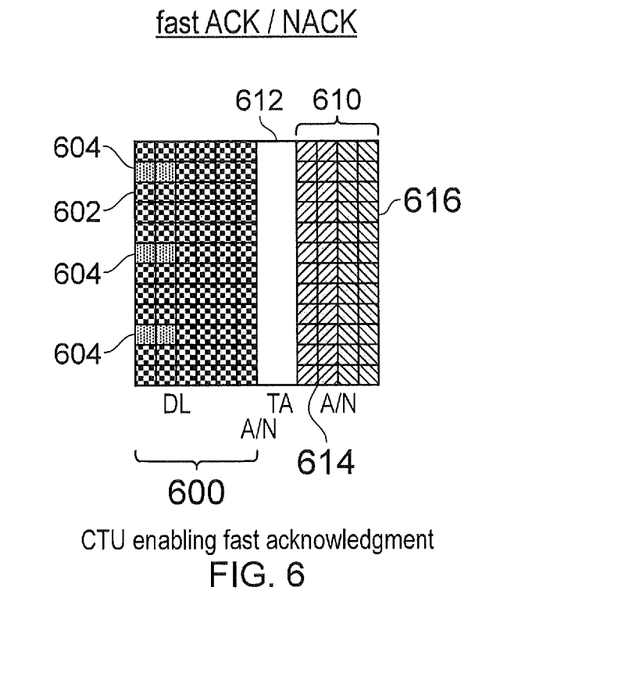
FIG. 6 is a schematic illustration of a combined transmission unit which includes transmission units for uplink and downlink transmissions according to the present technique.

The CTU can also be constructed for different functions, for example, for Ultra-Reliable Low-Latency communication (URLLC). For an URLLC application, the CTU can enable a fast ACK/NACK for a TDD system such as the example shown in FIG. 6. In FIG. 6, a downlink section 600 is provided for the transmission of downlink data in data supporting DTU's 602 with separate reference symbols 604. An ACK/NACK symbol is transmitted on the uplink in response to the downlink transmission of data in the first section 600 in an uplink transmission section 610 which is separated by a void or blank section 612. In the left-hand side of the uplink section 612 the TU's are allocated for transmitting reference symbols whereas the second column of TU's 616 is used for transmitting data representing the ACK/NACK signal. Here the CTU firstly consists of downlink data plus some reference signals followed by some blank TUs. The blank TUs 612 allow the UE to perform timing advance, to switch from downlink to uplink, process the downlink data and prepare for the acknowledgement in the following uplink TUs. The CTU in FIG. 6 can be further extended for example to have longer DL transmission such as for eMBB as shown in the example in FIG. 7.

Figure 7:
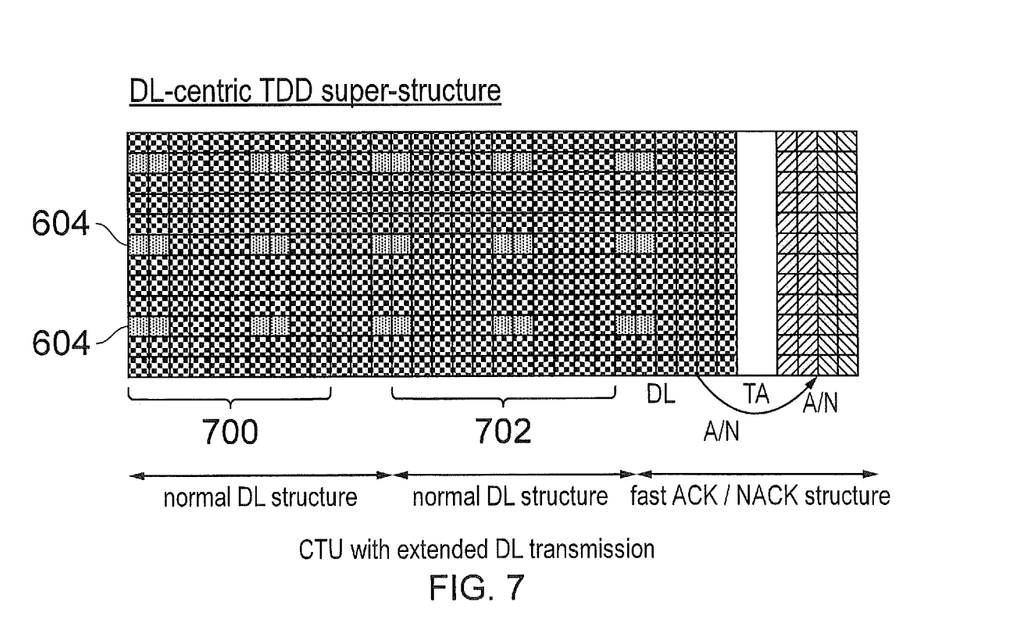
FIG. 7 is a schematic illustration of further example of a combined transmission unit which includes transmission units for uplink and downlink transmissions having an extended down link transmission section according to the present technique.

In the example shown in FIG. 7 which corresponds to the example shown in FIG. 6 the CTU is shown to include a first and second section dedicate to the transmission of downlink data providing a normal density of reference symbols 604 followed by a section 704 which corresponds to the CTU showing in FIG. 6.

Figure 8:
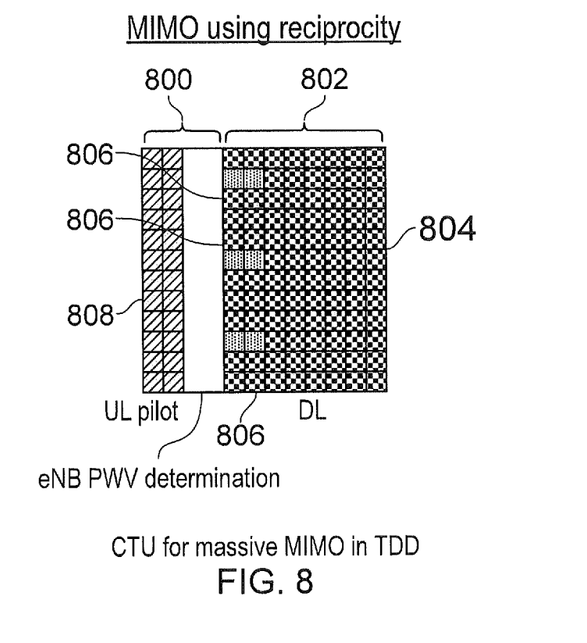
FIG. 8 is a schematic illustration of a combined transmission unit which includes transmission units for uplink and downlink transmissions which are configured to support a Multiple Input Multiple Output scheme according to the present technique.

CTU can be formed for massive MIMO transmission (i.e. basestation with large number of transmission elements) in TDD, where providing reference signal and feedback for each of the transmission element is not practical. In a TDD system, the network can make use of channel reciprocity by providing resource for the UE in the uplink for sending pilot (reference signals) prior to transmitting downlink (MIMO) data to the UE in the same resources. A CTU as shown in FIG. 8 can be used for such transmission. Here the CTU consists of pilot TUs, followed by blank TUs to allow the network to determine the precoding weights prior to sending the downlink data to the UE. NOTE: In this example the network can send a control indicator (e.g. such as a DCI) to the UE in a separate CTU to schedule the CTU shown in FIG. 8.

Figure 9:
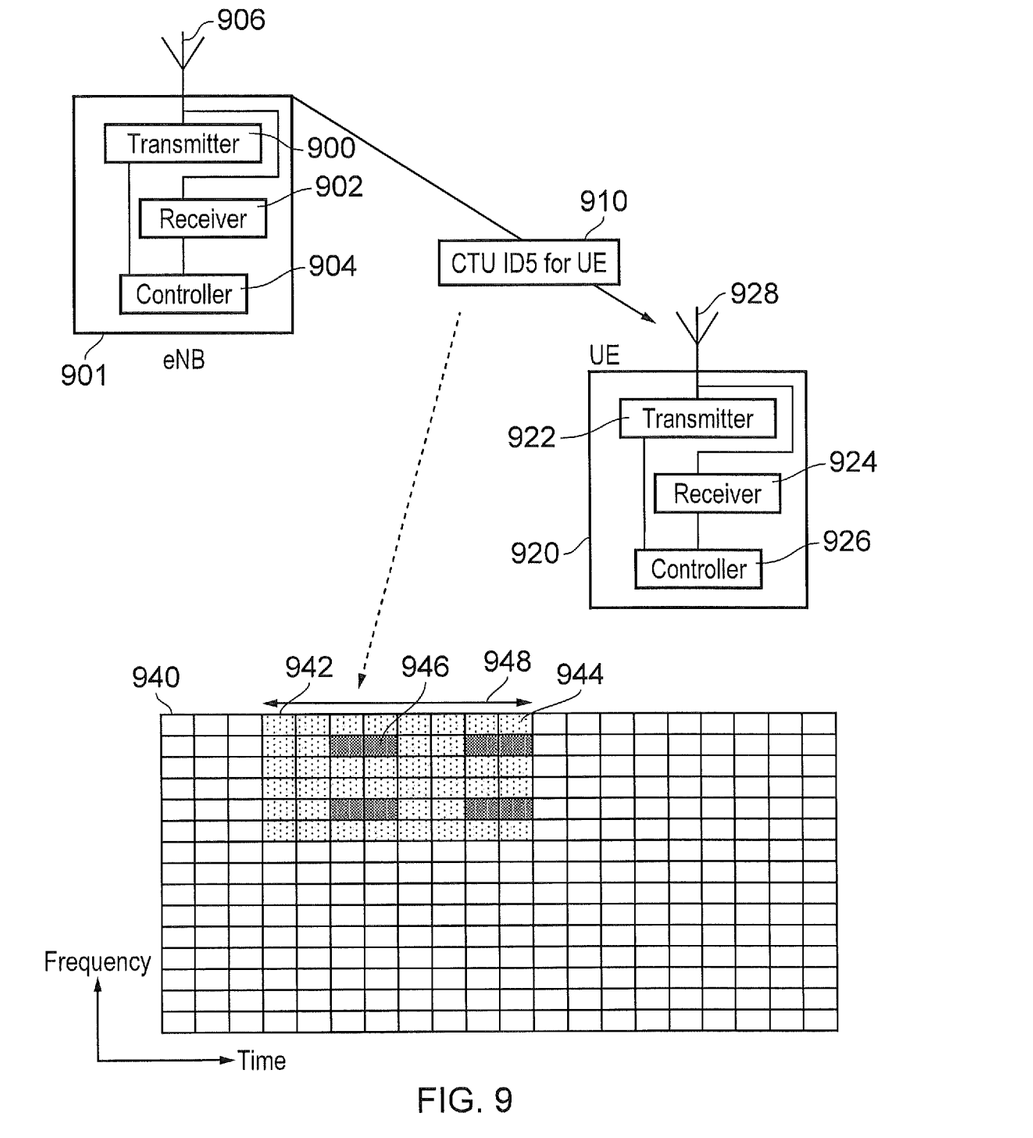
FIG. 9 is a schematic illustration part block diagram illustrating an arrangement in which a communications device receives an indication of a combined transmission unit for transmitting or receiving via a wireless communications network.

An example embodiments of the present technique in which a UE is signalled a CTU for use in transmitting or receiving data depending on the CTU as showing in FIG. 9. As shown in FIG. 9 an eNodeB 901 is shown to include a transmitter 900, a receiver 902 and a controller 904. The controller 904 controllers the transmitter 900 and the receiver 902 to transmit and receiver signals via an antenna 906. The eNodeB 901 is shown to transmit a signalling message 910 to a UE 920. The UE 920 includes a transmitter 922, a receiver 924 and a controller 926. The controller 926 controls the transmitter 922 and the receiver 924 to transmit signals to the eNodeB 901 and receiver signals from the eNodeB 901 via an antenna 928.

As will be appreciated in order to configure a UE to receive or transmit data via a CTU, the structure of the CTU and its location within timer and frequency resources providing by a system bandwidth needs to be signalled to a UE 920. As shown in FIG. 9 represented by a grid of boxes 940 is a representation of time and frequency resources which are available to the eNodeB for allocation to UE's operating within a mobile communications network of which the eNodeB 901 forms part. As explained above each of the boxes within the grid 904 representing the timed frequency resources can represent a basic unit of communications resource such as a Resource Element. One or more of the units of communications resource can be combined to form a TU which can be allocated by the eNodeB on an individual basis to a UE. The eNodeB can also determine the type of use which each TU will be dedicated for allocating a CTU to a UE. As shown in FIG. 9 within a bolder block 904 representing a CTU which has been allocated to a UE 920 an example CTU is shown to include TU's dedicated to data 944 and TU's dedicated to transmitting reference symbols 946. As shown in FIG. 9, message element 910 is transmitted to the UE 920 which identifies the CTU 942 for use by the UE in receiving or transmitting data. For example the CTU 942 may represent a downlink transmission of data to the UE 920. Therefore the CTU width 948 may represent the frame length for the UE which may be dedicated and tailored to an application being provided by the UE 920.

The CTU can be designed to be self-contained for both TDD and FDD. An FDD self-contained CTU does not rely on the presence of surrounding structures in order to be decodable. A TDD self-contained CTU does not rely on surrounding structures and may additionally contain TUs for both link directions (in FDD, it would also be possible to define some association between TUs in UL and DL directions in order to create self-contained CTU, but this may rely on some known timing relationship between UL and DL carriers). When the CTU are self-contained, it is much easier to provide for forward compatibility.

The components of a CTU are signalled to the UE or blind decoded by the UE. The following are embodiments where this can be done.

In an embodiment the synchronization signals (e.g. PSS or SSS in LTE) are transmitted in a known CTU. The sequences in the synchronization signal would indicate the CTU construction for the primary broadcast message (e.g. PBCH in LTE).

In another embodiment the primary broadcast message is transmitted in a known CTU and the primary broadcast message would indicate the CTU construction for the SIBs. The SIBs can further indicate the CTU construction for other common messages.

In another embodiment, the UE blind decodes an initial broadcast channel based on several blind decoding hypotheses of the CTU construction of the broadcast channel. The broadcast channel may then, possibly hierarchically, define the other CTU constructions to be used in the system.

It should be appreciated that there can be a large number of different TUs combinations leading to a large number of possible CTUs. It is likely that only a small subset of possible CTU constructions are used.

Hence in another embodiment, the broadcast common messages such as PBCH and SIB indicate a set of CTU constructions that are used by the network.

In another embodiment, the indication of the CTU constructions can be hierarchical. As an example, a known CTU construction can be applied to a broadcast channel (such as the LTE PBCH). The broadcast channel can then define a larger set of CTU constructions for a further channel transmitting system information. The system information channel then may transmit an even larger set of CTU constructions that are to be used in the system. This hierarchical approach to signalling CTU constructions has the advantages of allowing the system to bootstrap while minimising message sizes on channels with constrained message-carrying capacity (such as the broadcast channel).

In another embodiment the possible set of CTUs construction are listed in the specifications and are numerated. The network can then indicate the CTUs used by signalling the numerated indices in the broadcast messages (e.g. PBCH and SIB).

In another embodiment the CTU construction is UE specific and indicated by higher layer messages (e.g. such as RRC). Here the UE upon connection would indicate the type of services it requires and the network would then configure a CTU that is suitable for this service. For example if the UE requires URLLC, the network can configure a CTU that has very short length (e.g. 0.2 ms) to allow message to be sent with quick turnaround time.

A UE configured with one type of CTU will use it until it is reconfigured by another type of CTU. Such reconfiguration can be dependent for example, upon a change to the UE's service or radio condition.

In another embodiment, the UE is only able to operate with a limited set of CTU constructions. For example, a low complexity MTC device may not be able to operate with the fast ACK/NACK construction shown in FIG. 6. In this case, the UE may signal its CTU capability by using a PRACH preamble resource from a set of PRACH preamble resources. The base station knows the CTU capability of the device based on the PRACH preamble used by the device.

In another embodiment, the UE decodes broadcast information on CTU constructions from a plurality of cells. The UE then camps onto a cell that uses a CTU construction that is compatible with that UE.

In another embodiment the CTU construction is indicated in the DL or UL grant (e.g. DCI in LTE) which is sent using layer 1 messages, giving high flexibility to the network in each transmission. This allows the network to adapt to the UE's condition and possibly change of services. For example, the UE may initially move in a low speed (e.g. walking toward the car) and then suddenly move to high speed (e.g. drive into a highway) and such dynamic CTU indication would enable smooth transition of frame structure from low speed to high speed. In the DL grant, the CTU indication can either be explicit, enumerated or implicit:

explicit: the constituent TUs and their locations are explicitly defined enumerated: a common message (e.g. PBCH, SIB) enumerates a list of potential CTU constructions. The DL grant indicates an index of the enumerated CRU implicit: the CTU construction to use is explicitly understood by the UE based on other contents of the DCI. For example, if the DCI indicates a transport block coded with a low coding rate (for low SNR conditions), the UE implicitly understands that a CTU construction using a larger number of reference symbols is used. Another implicit way is based on for example the MCS or Transport Block size used in the grant which can have a direct mapping to a specific CTU construction.

In another embodiment, the DL grant (dynamic indication in layer 1 message) can indicate a CTU construction that is valid for a fixed duration of period (e.g. X ms). This can reduce the amount of signaling required. For example the CTU used in TDD can consists of 4 DL data TUs, some blank TUs and 4 UL data TUs and this can be used for X ms.

In another embodiment a basic CTU construction is signalled to the UE either using RRC or DL grant and incremental changes to this basic CTU is signalled to the UE further DL grants. For example, the basic CTU construction can consists of 4 DL data TUs and if the network can indicate additional DL TUs in steps of 4 DL data TUs to provide additional resources in the downlink. In another example, the CTU construction is indicated by RRC (or specified a-priori) to consist of 'N' fixed/semi static TUs and 'M' TUs that are signalled dynamically in DCI.

In another embodiment some channels such as control channel (e.g. EPDCCH or PDCCH in LTE) uses a semi-static CTU construction that is signalled by higher layers such as RRC. The control channel would then indicate the CTU construction for the data channel (e.g. PDSCH or PUSCH in LTE) dynamically via a grant. An example network may transmit to a TDD UE using massive MIMO and indicate a CTU construction such as that in FIG. 8 and at a later scheduling instance it may decide not to use massive MIMO and schedule the UE using a prolonged DL transmission such as that in FIG. 7.

It should be appreciated that by providing flexibility to the frame structure such as using CTU, the network can provide a broad range of use cases to different devices within the same carrier.

Various further aspects and features of the present technique are defined in the following numbered paragraphs:

Paragraph 1. A communications device configured to transmit signals to and/or receive signals from an infrastructure equipment of a wireless communications network, the communications device comprising a receiver configured to receive signals transmitted by the infrastructure equipment, a transmitter configured to transmit signals to the infrastructure equipment, and a controller configured to control the transmitter and the receiver, wherein the mobile communications network forms a wireless access interface comprising a plurality of communications resource elements by dividing a system bandwidth in time and frequency, the wireless access interface being configured as comprising a plurality of transmission units, each of the transmission units comprising a predetermined number of the communications resource elements, and one or more transmission units are configured to form combined transmission units, which can be allocated by the wireless communications network to one or more communications devices for receiving signals from the infrastructure equipment or transmitting signals to the infrastructure equipment, and the controller is configured with the receiver to receive an indication from the infrastructure equipment of a combined transmission unit providing one or more transmission units for the communications device, and to receive an indication for each of the one or more transmission units of the combined transmission unit of whether the transmission unit is for transmitting signals to the infrastructure equipment -on the uplink, whether the transmission unit is for receiving signals from the infrastructure equipment on the downlink or whether the transmission unit is not to be used for transmitting or receiving signals Paragraph 2. A communications device according to paragraph 1, wherein the controller in combination with the receiver is configured to receive an indication of a type of signals which are to be transmitted or received in each of the transmission units.

Paragraph 3. A communications device according to paragraph 2, wherein the indicated type of signals which are to be transmitted or received in the transmission units includes one of signals representing data, signals representing reference signals, signals representing synchronisation signals or an indication that no signals are to be transmitted.

Paragraph 4. A communications device according to paragraph 1, 2 or 3, wherein the controller is configured with the receiver to receive an indication from the infrastructure equipment that the combined transmission unit is allocated repeatedly.

Paragraph 5. A communications device according to paragraph 4, wherein the combined transmission unit is allocated repeatedly for a predetermined number of times according to semi-persistent allocation.

Paragraph 6. A communications device as claims in claim 4, wherein the combined transmission unit is allocated repeatedly until the receiver receives an indication from the infrastructure equipment terminating the allocation.

Paragraph 7. A communications device as claims in any of claims 1 to 6, wherein the controller is configured with the receiver to receive an indication from the infrastructure equipment that the allocated combined transmission unit is changed to a different combined transmission unit providing a different configuration of one or more transmission units.

Paragraph 8. A communications device according to any of paragraphs 1 to 7, wherein a temporal length of the combined transmission unit of the communications resources elements of the transmission units provides a frame structure for transmitting data represented as signal or receiving data represented as signal in each repeated occurrence of the combined transmission unit.

Paragraph 9. A communications device according to any of paragraphs 2 to 8, wherein the combined transmission unit provides one or more transmission units for receiving signals from the infrastructure equipment on the downlink and one or more transmission units for transmitting signals on the uplink.

Paragraph 10. A communications device according to paragraph 9, wherein the one or more transmission units provided for receiving signals from the infrastructure equipment on the downlink are arranged together and before the one or more transmission units for transmitting signals on the uplink, the one or more downlink transmission units being configured for receiving a data unit and the one or more uplink transmission units being configured for transmitting an acknowledgement of successfully receiving the data unit or transmitting a negative acknowledgement of not successfully receiving the data unit.

Paragraph 11. A communications device according to any of paragraphs 1 to 10, wherein the transmitter and the receiver are configured in accordance with a default combined transmission unit providing one or more transmission units for receiving the indication of the combined transmission unit.

Paragraph 12 A method of transmitting signals to an infrastructure equipment of a wireless communications network from a communications device and/or receiving signals at the communications device transmitted from the infrastructure equipment, the method comprising
    receiving an indication from the infrastructure equipment of a combined transmission unit providing one or more transmission units for the communications device, and
    receiving an indication for each of the one or more transmission units of the combined transmission unit of whether the transmission unit is for transmitting signals to the infrastructure equipment on the uplink, whether the transmission unit is for receiving signals transmitted from the infrastructure equipment on the downlink or whether the transmission unit is not to be used for transmitting signals or receiving signals, the one or more transmission units being provided from a wireless access interface within a system bandwidth of the wireless communications network a plurality of communications resource elements divided in time and frequency, each transmission unit comprising one or more of the communications resource elements configured as the transmission units, and the one or more transmission units being used to form the combined transmission unit.

Paragraph 13. A method according to paragraph 12, comprising
    receiving an indication a type of signals which are to be transmitted or receive in each of the transmission units.

Paragraph 14. A method according to paragraph 12 or 13, wherein the indicated type of signals which are to be transmitted or received in the transmission units includes one of signals representing data, signals representing reference signals, signals representing synchronisation signals or an indication that no signals are to be transmitted.

Paragraph 15. A method according to paragraph 12, 13 or 14, comprising
    receiving an indication from the infrastructure equipment that the combined transmission unit is allocated repeatedly.

Paragraph 16. A method according to paragraph 15, wherein the received indication indicates that the combined transmission unit is allocated repeatedly for a predetermined number of times according to semi-persistent allocation.

Paragraph 17. A method as claims in claim 15, wherein the received indication indicates that the combined transmission unit is allocated repeatedly until the receiver receives an indication from the infrastructure equipment terminating the allocation.

Paragraph 18. A method as claims in any of claims 12 to 17, comprising
    receiving an indication from the infrastructure equipment that the allocated combined transmission unit is changed to a different combined transmission unit providing a different configuration of one or more transmission units.

Paragraph 19. A method according to any of paragraphs 12 to 18, wherein a temporal length of the combined transmission unit of the communications resources elements of the transmission units provides a frame structure for transmitting data represented as signal or receiving data represented as signal in each repeated occurrence of the combined transmission unit.

Paragraph 20. An infrastructure equipment for forming part of a wireless communications network, the infrastructure equipment comprising
    a receiver configured to receive signals transmitted by one or more communications devices,
    a transmitter configured to transmit signals to the one or more communications devices, and
    a controller configured to control the transmitter and the receiver and to allocate communications resource elements of a wireless access interface, the wireless access interface comprising a plurality of communications resource elements formed by dividing a system bandwidth in time and frequency, wherein the controller is configured to configure the wireless access interface as comprising a plurality of transmission units, each of the transmission units comprising a predetermined number of the communications resource elements, and one or more transmission units are configured to form combined transmission units, which can be allocated by the infrastructure equipment to one or more of the communications devices for receiving signals from the infrastructure equipment or transmitting signals to the infrastructure equipment, and the controller is configured with the transmitter
    to transmit an indication to a communications device of a combined transmission unit providing one or more transmission units for the communications device, and
    to transmit an indication for each of the one or more transmission units of the combined transmission unit of whether the transmission unit is for transmitting signals to the infrastructure equipment -on the uplink, whether the transmission unit is for receiving signals from the infrastructure equipment on the downlink or whether the transmission unit is not to be used for transmitting signals.

Paragraph 21. An infrastructure equipment according to paragraph 20, wherein the controller in combination with the transmitter is configured to transmit an indication an indication a type of signals which are to be transmitted or receive in each of the transmission units.

Paragraph 22. An infrastructure equipment according to paragraph 21, wherein the indicated type of signals which are to be transmitted or received in the transmission units includes one of signals representing data, signals representing reference signals, signals representing synchronisation signals or an indication that no signals are to be transmitted.

Paragraph 23. An infrastructure equipment according to paragraph 20, 21 or 22, wherein the controller is configured with the transmitter to transmit an indication to the communications device that the combined transmission unit is allocated repeatedly.

Paragraph 24. An infrastructure equipment according to paragraph 23, wherein the combined transmission unit is allocated repeatedly for a predetermined number of times according to semi-persistent allocation.

Paragraph 25. An infrastructure equipment as claims in claim 23, wherein the combined transmission unit is allocated repeatedly until the receiver receives an indication from the infrastructure equipment terminating the allocation.

Paragraph 26. An infrastructure equipment as claims in any of claims 20 to 25, wherein the controller is configured with the transmitter to transmit an indication to the communications device that the allocated combined transmission unit is changed to a different combined transmission unit providing a different configuration of one or more transmission units.

Paragraph 27. An infrastructure equipment according to any of paragraphs 20 to 26, wherein a temporal length of the combined transmission unit of the communications resources elements of the transmission units provides a frame structure for transmitting data represented as signal or receiving data represented as signal in each repeated occurrence of the combined transmission unit.

Paragraph 28. An infrastructure equipment according to any of paragraphs 20 to 27, wherein the combined transmission unit provides one or more transmission units for receiving signals from the communications device on the uplink and one or more transmission units for transmitting signals to the communications device on the downlink.

Paragraph 29. An infrastructure equipment according to paragraph 28, wherein the one or more transmission units provided for transmitting signals to the communications device on the downlink are arranged together and before the one or more transmission units for receiving signals from the communications device on the uplink, the one or more downlink transmission units being configured for transmitting a data unit and the one or more uplink transmission units being configured for receiving an acknowledgement of successfully transmitting the data unit or receiving a negative acknowledgement of not successfully transmitting the data unit.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in W.

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manlier to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, -via the transmission of Uplink Control Information UCI on the PUCCH when there is no existing PUSCH allocation for the UE, or by transmission directly on the PUSCH when there is an existing PUSCH allocation for the LTE. In response to a scheduling request, the eNodeB is configured to allocate a portion of the PUSCH resource to the requesting. UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending HE in order to transmit some of its buffered uplink data and then inform the UE of the resource allocation via a DCI in the PDCCH. For example, presuming a LT has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data-, at first comprising a buffer status report, and or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-160671, "New SID Proposal: Study on New Radio Access Technology," NTT DOCOMO, R AN #71

What is claimed is:

1. A communications device configured to perform one or more of transmitting signals to and receiving signals from an infrastructure equipment of a wireless communications network, the communications device, comprising:
a receiver configured to receive signals transmitted by the infrastructure equipment;
a transmitter configured to transmit signals to the infrastructure equipment; and
circuitry configured to control the transmitter and the receiver, wherein the wireless communications network forms a wireless access interface comprising a plurality of communications resource elements by dividing a system bandwidth in time and frequency, the wireless access interface being configured as a plurality of transmission resources, each of the plurality of transmission resources comprising a predetermined number of the communications resource elements, and one or more transmission resources are configured to form combined transmission units, which can be allocated by the wireless communications network to one or more communications devices for receiving signals from the infrastructure equipment or transmitting signals to the infrastructure equipment, and the circuitry is configured to receive an indication, from the infrastructure equipment, of a location within time and frequency resources and a construction of a combined transmission unit, wherein a dynamic configuration of the communications device to receive or transmit data via the combined transmission unit is based on the location within the time and frequency resources and the construction of the combined transmission unit, wherein a width of the combined transmission unit represents a frame length for the communications device which is tailored to an application being provided by the communications device, wherein the combined transmission unit provides one or more transmission resources for the communications device, wherein the indication is a downlink or uplink grant, and the indication is an explicit indication, receive an indication for each of the one or more transmission resources of the combined transmission units of whether the transmission resource is for transmitting signals to the infrastructure equipment on the uplink, whether the transmission resource is for receiving signals from the infrastructure equipment on the downlink or whether the transmission resource is not to be used for transmitting or receiving signals, and receive an indication of a type of signals which are to be transmitted or received in each of the transmission resources, wherein the indicated type of signals which are to be transmitted or received in the transmission resources includes an indication that no signals are to be transmitted.

2. The communications device as claimed in claim 1, wherein the circuitry is further configured with the receiver to receive an indication from the infrastructure equipment that the combined transmission unit is allocated repeatedly.

3. The communications device as claimed in claim 2, wherein the combined transmission unit is allocated repeatedly for a predetermined number of times according to semi-persistent allocation.

4. The communications device as claims in claim 2, wherein the combined transmission unit is allocated repeatedly until the receiver receives an indication from the infrastructure equipment terminating the allocation.

5. The communications device as claims in claim 1, wherein the circuitry is further configured with the receiver to receive an indication from the infrastructure equipment that the allocated combined transmission unit is changed to a different combined transmission unit providing a different configuration of one or more transmission resources.

6. The communications device as claimed in claim 1, wherein a temporal length of the combined transmission unit of the communications resources elements of the transmission resources provides a frame structure for transmitting data represented as signal or receiving data represented as signal in each of a repeated occurrence of the combined transmission unit.

7. The communications device as claimed in claim 1, wherein the combined transmission unit provides one or more transmission resources for receiving signals from the infrastructure equipment on the downlink and one or more transmission resources for transmitting signals on the uplink.

8. The communications device as claimed in claim 7, wherein the one or more transmission resources provided for receiving signals from the infrastructure equipment on the downlink are arranged together and before the one or more transmission resources for transmitting signals on the uplink, the one or more downlink transmission resources being configured for receiving data and the one or more uplink transmission resources being configured for transmitting an acknowledgement of successfully receiving the data or transmitting a negative acknowledgement of not successfully receiving the data.

9. The communications device as claimed in claim 1, wherein the transmitter and the receiver are configured in accordance with a default combined transmission unit, wherein the default combined transmission unit provides one or more transmission resources for receiving the indication of the combined transmission unit.

10. The communications device as claimed in claim 1, wherein the indicated type of signals which are to be transmitted or received in the transmission units includes signals representing synchronization signals.

11. A method of one or more of transmitting signals to an infrastructure equipment of a wireless communications network from a communications device and receiving signals at the communications device transmitted from the infrastructure equipment, the method comprising receiving an indication, from the infrastructure equipment, of a location within time and frequency resources and a construction of a combined transmission unit, wherein a dynamic configuration of the communications device to receive or transmit data via the combined transmission unit is based on the location within the time and frequency resources and the construction of the combined transmission unit, wherein a width of the combined transmission unit represents a frame length for the communications device which is tailored to an application being provided by the communications device, wherein the combined transmission unit provides one or more transmission resources for the communications device, and wherein the indication is a downlink or uplink grant, and the indication is an explicit indication;

receiving an indication for each of the one or more transmission resources of the combined transmission units of whether the transmission resource is for transmitting signals to the infrastructure equipment on the uplink, whether the transmission resource is for receiving signals transmitted from the infrastructure equipment on the downlink or whether the transmission resource is not to be used for transmitting signals or receiving signals, the one or more transmission resources being provided from a wireless access interface within a system bandwidth of the wireless communications network a plurality of communications resource elements divided in time and frequency, each transmission resource comprising one or more of the communications resource elements configured as the transmission resources, and the one or more transmission resources being used to form the combined transmission unit; and receiving an indication of a type of signals which are to be transmitted or received in each of the transmission resources, wherein the indicated type of signals which are to be transmitted or received in the transmission resources includes an indication that no signals are to be transmitted.

12. The method as claimed in claim 11, comprising receiving an indication from the infrastructure equipment that the combined transmission unit is allocated repeatedly.

13. The method as claimed in claim 12, wherein the received indication indicates that the combined transmission unit is allocated repeatedly for a predetermined number of times according to semi-persistent allocation.

14. The method as claims in claim 12, wherein the received indication indicates that the combined transmission unit is allocated repeatedly until the receiver receives an indication from the infrastructure equipment terminating the allocation.

15. The method as claims in claim 11, comprising
receiving an indication from the infrastructure equipment that the allocated combined transmission unit is changed to a different combined transmission unit providing a different configuration of one or more transmission resources.

16. The method as claimed in claim 11, wherein a temporal length of the combined transmission unit of the communications resources elements of the transmission resources provides a frame structure for transmitting data represented as signal or receiving data represented as signal in each repeated occurrence of the combined transmission unit.

17. An infrastructure equipment for forming part of a wireless communications network, the infrastructure equipment comprising
a receiver configured to receive signals transmitted by one or more communications devices;
a transmitter configured to transmit signals to the one or more communications devices; and
circuitry configured to control the transmitter and the receiver and to allocate communications resource elements of a wireless access interface, the wireless access interface being configured as a plurality of communications resource elements formed by dividing a system bandwidth in time and frequency, wherein the wireless access interface comprises a plurality of transmission resources, each of the plurality of transmission resources comprising a predetermined number of the communications resource elements, and one or more transmission resources are configured to form combined transmission units, which can be allocated by the infrastructure equipment to one or more of the communications devices for receiving signals from the infrastructure equipment or transmitting signals to the infrastructure equipment, and the circuitry is configured to transmit an indication, to a communications device, of a location within time and frequency resources and a construction of a combined transmission unit providing one or more transmission resources for the communications device, wherein a dynamic configuration of the communications device to receive or transmit data via the combined transmission unit is based on the location within the time and frequency resources and the construction of the combined transmission unit, wherein a width of the combined transmission unit represents a frame length for the communications device which is tailored to an application being provided by the communications device, wherein the indication is a downlink or uplink grant, and the indication is an explicit indication, transmit an indication for each of the one or more transmission resources of the combined transmission unit of whether the transmission resource is for transmitting signals to the infrastructure equipment on the uplink, whether the transmission resource is for receiving signals from the infrastructure equipment on the downlink or whether the transmission resource is not to be used for transmitting signals, and transmit an indication of a type of signals which are to be transmitted or received in each of the transmission resources, wherein the indicated type of signals which are to be transmitted or received in the transmission resources includes an indication that no signals are to be transmitted.

* * * * *